W. A. LEGGO.
PAN FOR BACKING ELECTROTYPES.

No. 39,410. Patented Aug. 4, 1863.

Witnesses:
Rob't H. Louden
M. M. Livingston

Inventor:
W. A. Leggo

UNITED STATES PATENT OFFICE.

W. A. LEGGO, OF QUEBEC, CANADA.

IMPROVEMENT IN PANS FOR BACKING ELECTROTYPES.

Specification forming part of Letters Patent No. 39,410, dated August 4, 1863.

*To all whom it may concern:*

Be it known that I, W. A. LEGGO, of Quebec, in the Province of Canada, have invented a new and useful Improvement in Pans for Backing Electrotypes; and I do hereby declare that the following is a full, clear, and exact description of the same, reference being had to the accompanying drawings, forming a part of this specification, in which—

Figure 1:
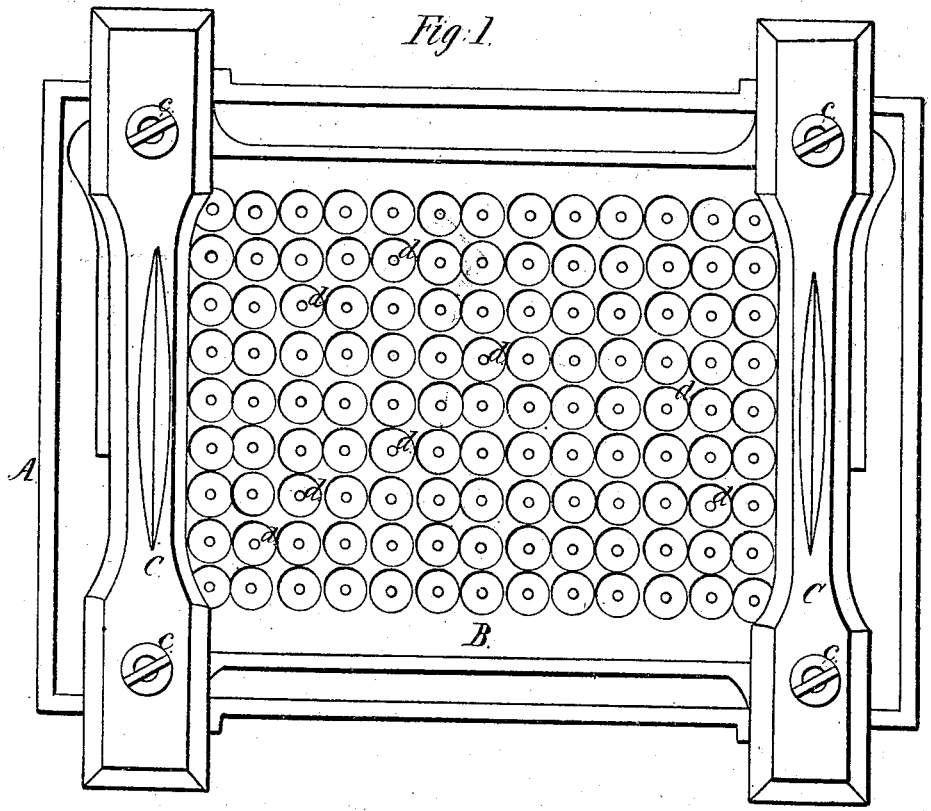
Figure 2:
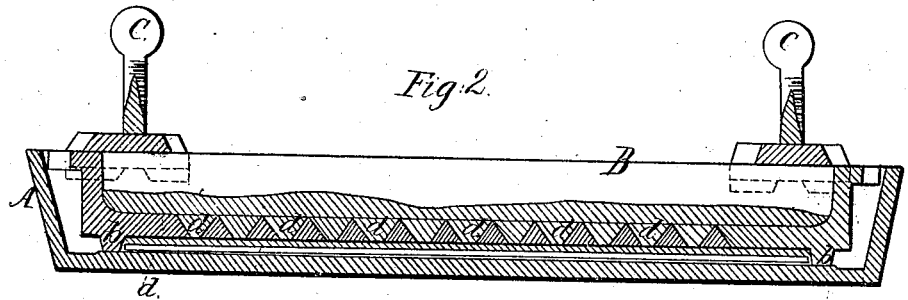

Figure 1 represents a plan or top view of my invention. Fig. 2 is a longitudinal vertical section of the same.

Similar letters of reference in both views indicate corresponding parts.

For the purpose of backing electrotypes two styles of pans are used at present, one known as the "open," and the other as the "closed" pan. With the open pan sound plates can be produced; but it is impossible either to determine the correct thickness of the plate or to guard it against distortion of face by shrinkage, there being no gage to effect this purpose. The closed pan is provided with a reliable gage to determine the thickness of the plate; but the metal cooling from the ends is liable to shrink in the middle, and an uneven and unsound plate is the result.

The pan which forms the object of the present invention differs from the ordinary closed pan in that the interior or upper pan is perforated throughout its surface with minute holes. The end attained by this simple contrivance is that all inclination to shrinkage in the electrotype-plate proper is done away with, as a constant flow of liquid metal is kept up from the upper to the lower plate until the lower plate solidifies, the metal contained in the upper pan being naturally the last to cool, and a sound plate of a uniform thickness throughout is the result.

To enable those skilled in the art to make and use my invention, I will proceed to describe it with reference to the drawings.

A represents the outer pan, made of cast-iron or any other suitable material, of sufficient size and depth for the occasion. The inner pan, B, is also made of cast-iron or other suitable material, and it fits into the pan A, being retained in position by ribs *a* rising from the bottom of the pan A, and by ribs *b*, projecting downward from the bottom of the pan B and catching over the ends of the ribs *a* of the pan A. Clamps C, which catch over lugs projecting from the edges of the pan A, and which are provided with set-screws *c*, to bear upon the edges of the pan B, serve to secure the inner in the outer pan and to hold it firmly in position. By means of the ribs *a b* an open space is formed between the bottom of the pan A and that of the pan B to receive the shell and to determine the thickness of the plate. It is obvious that by altering the height of these ribs the thickness of the plate can be varied as much as may be desired. The bottom of the inner pan, B, is perforated with a large number of holes, *d*, through which the liquid metal runs down to the space between the bottom of the two pans.

The operation is as follows: The pans being placed in the liquid metal, first the upper and then the lower are allowed to remain until the lower pan has attained the heat necessary to fuse the tin on the electrotype-shell. It is then withdrawn and placed upon a cooling-slab. The shell previously tinned is placed thereon, the upper pan adjusted and secured in position by the clamps C or by any other equivalent means, and the metal poured into the upper pan, the more quickly the better. From this pan the metal descends in a shower upon the electrotype-shell, pressing it down equally at every point, thus obviating the use of springs or weighted wires, which are very troublesome in their application. The whole is then allowed to cool and the upper pan is detached. By a slight blow of a mallet the little joints of metal binding together the sheet of metal in the upper and that in the lower pan are broken, and the electrotype-plate is released. It is perfectly backed up, being even on the face, equal in thickness all over, and sound in texture. In this way a perfect sheet of metal is always obtained, even on its face, and of any desired thickness, doing away entirely with the necessity of shaving and economizing largely in money and time. The frequent handling of the plate is obviated and a superior article is produced, as the more an electrotype-plate is handled the more it is liable to accidents.

The number and distribution of the holes in the bottom of the inner pan is a matter of little moment, as the object to be attained is simply to supply liquid metal to the shell throughout its extent. Holes bored at intervals of three or four inches will be found sufficient for ordinary purposes; but when it is desired to back very small forms it will be necessary to have the holes placed more closely together, as the metal supplied in this way acts as a spring or weight to keep the shell in its proper position. If the holes are so arranged that the metal shall fall through the upper pan immediately upon the shell placed underneath and cover said shell throughout, every end that can be desired in backing electrotype-plates will have been attained—that is, evenness of face, regularity in thickness, and soundness of metal.

By providing the pans with proper gages the electrotype-shells may be at once backed up to the height of ordinary type, requiring nothing further than the trimming of the edges to make them ready for the printer.

What I claim as new, and desire to secure by Letters Patent, is—

The perforations or holes $d$ in the bottom of the inner pan, B, when the same is used, in combination with the outer pan, A, in the manner and for the purpose substantially as herein shown and described.

W. A. LEGGO.

Witnesses:
ROBT. H. SOULLIN,
M. M. LIVINGSTON.